United States Patent
Hwang et al.

(10) Patent No.: US 12,007,018 B2
(45) Date of Patent: Jun. 11, 2024

(54) HYDRAULIC PRESSURE CONTROL METHOD FOR A VEHICLE TRANSMISSION

(71) Applicants: HYUNDAI MOTOR COMPANY, Seoul (KR); KIA CORPORATION, Seoul (KR)

(72) Inventors: Jin Young Hwang, Suwon-si (KR); Bong Uk Bae, Daegu (KR); Ki Bum Kim, Seoul (KR); Se Hwan Jo, Bucheon-si (KR); Seong Min Son, Pohang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 214 days.

(21) Appl. No.: 17/744,193

(22) Filed: May 13, 2022

(65) Prior Publication Data
US 2023/0053741 A1    Feb. 23, 2023

(30) Foreign Application Priority Data
Aug. 18, 2021 (KR) .................. 10-2021-0109045

(51) Int. Cl.
*F16H 61/00* (2006.01)
*F16H 59/42* (2006.01)
(Continued)

(52) U.S. Cl.
CPC ......... *F16H 61/0021* (2013.01); *F16H 59/42* (2013.01); *F16H 59/44* (2013.01);
(Continued)

(58) Field of Classification Search
None
See application file for complete search history.

(56) References Cited

U.S. PATENT DOCUMENTS

| 2,761,328 A | * | 9/1956 | Herndon | F16H 61/0269 |
| | | | | 477/130 |
| 10,119,610 B2 | * | 11/2018 | Lee | F16H 57/0446 |

(Continued)

FOREIGN PATENT DOCUMENTS

| CN | 1791758 A | * | 6/2006 | ............ B60W 10/04 |
| CN | 100460728 C | * | 2/2009 | ............ B60W 10/04 |

(Continued)

*Primary Examiner* — Kevin R Steckbauer
(74) *Attorney, Agent, or Firm* — Lempia Summerfield Katz LLC

(57) ABSTRACT

A hydraulic pressure control method for a vehicle transmission includes accumulating factors representing vehicle usage, accumulating factors representing driver's driving tendency, calculating a first line pressure compensation value according to the usage depending on the accumulated values of the factors representing the vehicle usage, calculating a second line pressure compensation value according to the driver's driving tendency depending on the accumulated values of the factors representing the driver's driving tendency, determining a final line pressure by adding the first and second line pressure compensation values according to the usage and the driver's driving tendency to a basic line pressure, and operating a transmission hydraulic system according to the final line pressure.

9 Claims, 5 Drawing Sheets

(51) Int. Cl.
  *F16H 59/44*  (2006.01)
  *F16H 59/48*  (2006.01)
  *F16H 59/50*  (2006.01)
  *F16H 59/72*  (2006.01)
  *F16H 61/02*  (2006.01)
  *F16H 59/14*  (2006.01)

(52) U.S. Cl.
  CPC ............. *F16H 59/48* (2013.01); *F16H 59/50* (2013.01); *F16H 59/72* (2013.01); *F16H 61/0025* (2013.01); *F16H 61/0265* (2013.01); *F16H 61/0274* (2013.01); *F16H 61/0276* (2013.01); *F16H 2059/147* (2013.01); *F16H 2061/0096* (2013.01)

(56) References Cited

U.S. PATENT DOCUMENTS

| | | | | |
|---|---|---|---|---|
| 10,400,893 | B2 * | 9/2019 | Inoue | F16H 61/662 |
| 10,550,938 | B2 * | 2/2020 | Iwasa | B60W 20/00 |
| 10,830,340 | B2 * | 11/2020 | Matsuoka | F16H 59/14 |
| 2001/0049315 | A1 * | 12/2001 | Tsutsui | F16H 61/66272 |
| | | | | 477/44 |
| 2009/0131218 | A1 * | 5/2009 | Nedachi | F16D 48/08 |
| | | | | 477/97 |
| 2017/0130824 | A1 * | 5/2017 | Lee | F16H 61/0021 |
| 2018/0080552 | A1 * | 3/2018 | Iwasa | F16H 9/18 |
| 2018/0142783 | A1 * | 5/2018 | Takahashi | F16H 61/0021 |
| 2018/0180178 | A1 * | 6/2018 | Inoue | F16H 61/0021 |
| 2020/0325984 | A1 * | 10/2020 | Matsuoka | B60W 10/103 |
| 2023/0053741 | A1 * | 2/2023 | Hwang | F16H 61/0025 |

FOREIGN PATENT DOCUMENTS

| | | | | |
|---|---|---|---|---|
| CN | 102523752 A | * | 6/2012 | .......... B60W 10/026 |
| CN | 102523752 B | * | 12/2014 | .......... B60W 10/026 |
| CN | 107407400 A | * | 11/2017 | ............ B60K 6/543 |
| CN | 107709841 A | * | 2/2018 | ............ F16H 37/022 |
| CN | 108027044 A | * | 5/2018 | ......... F16H 61/0021 |
| CN | 106678355 B | * | 10/2018 | |
| CN | 107709841 B | * | 8/2019 | ............ F16H 37/022 |
| CN | 107407400 B | * | 9/2019 | ............ B60K 6/543 |
| CN | 107407401 B | * | 9/2019 | .............. B60K 6/36 |
| EP | 1902920 A1 | * | 3/2008 | ............ B60W 10/02 |
| EP | 2299146 A1 | * | 3/2011 | ......... F16H 61/0021 |
| EP | 2299146 B1 | * | 8/2013 | ......... F16H 61/0021 |
| EP | 3276217 A1 | * | 1/2018 | .............. B60K 6/36 |
| EP | 3306144 A1 | * | 4/2018 | ......... F16H 61/0021 |
| EP | 3315823 A1 | * | 5/2018 | ............ F16H 37/022 |
| EP | 3306144 A4 | * | 6/2018 | ......... F16H 61/0021 |
| EP | 3604862 B1 | * | 7/2022 | .......... B60W 10/023 |
| FR | 2853036 A1 | * | 10/2004 | ....... F16H 61/66272 |
| JP | 2000097321 A | * | 4/2000 | |
| JP | 2002372145 A | * | 12/2002 | |
| JP | 3480308 B2 | * | 12/2003 | |
| JP | 2004293629 A | * | 10/2004 | |
| JP | 4044220 B2 | * | 2/2008 | |
| JP | 4173757 B2 | * | 10/2008 | |
| JP | 5831287 B2 | * | 12/2015 | |
| JP | 2018155303 A | * | 10/2018 | ......... F16H 57/0435 |
| JP | 6485477 B2 | * | 3/2019 | ......... F16H 57/0435 |
| JP | 6640212 B2 | * | 2/2020 | ......... F16H 61/0021 |
| JP | 6725747 B2 | * | 7/2020 | .......... B60W 10/023 |
| JP | 7279626 B2 | * | 5/2023 | ............ B60K 6/445 |
| KR | 20170053067 A | | 5/2017 | |
| WO | WO-2016194597 A1 | * | 12/2016 | ......... F16H 61/0021 |
| WO | WO-2016208438 A1 | * | 12/2016 | ............ F16H 37/022 |
| WO | WO-2018168337 A1 | * | 9/2018 | ......... F16H 57/0435 |
| WO | WO-2018173906 A1 | * | 9/2018 | .......... B60W 10/023 |
| WO | WO-2023072293 A1 | * | 5/2023 | |

* cited by examiner

HYDRAULIC PRESSURE CONTROL METHOD FOR A VEHICLE TRANSMISSION

CROSS REFERENCE TO RELATED APPLICATION

This application claims priority to and the benefits of Korean Patent Application No. 10-2021-0109045, filed Aug. 18, 2021, the entire contents of which are incorporated herein by reference.

BACKGROUND

Field

The present disclosure relates to a technology for controlling the hydraulic pressure of a transmission for a vehicle.

Description of the Related Art

In a transmission of a vehicle configured to be operated and controlled by hydraulic pressure, as a driving mileage of a vehicle increases, the leakage from an oil pump, a valve body, a solenoid valve, etc. increases, so that a phenomenon that an actual line pressure becomes lower than an initially set line pressure may occur.

When the actual line pressure used in the transmission is lowered as described above, problems such as damage to the transmission and unintentional slippage of a clutch due to a malfunction of a fail-safe system based on the line pressure may occur.

The foregoing is intended merely to aid in the understanding of the background of the present disclosure, and is not intended to mean that the present disclosure falls within the purview of the related art that is already known to those having ordinary skill in the art.

SUMMARY

Accordingly, an objective of the present disclosure is to provide a method of controlling the hydraulic pressure of a vehicle transmission, whereby a decrease in line pressure of a transmission according to aging due to an increase in the mileage of a vehicle is prevented so that a malfunction of a transmission fail-safe system and unexpected clutch slippage, etc. of the transmission are prevented so as to ensure and maintain smooth and stable operability of the transmission.

In an aspect of the present disclosure, a hydraulic pressure control method for a vehicle transmission includes: accumulating factors representing usage of a vehicle; accumulating factors representing a driving tendency of a driver of the vehicle; calculating a first line pressure compensation value according to the usage depending on the accumulated values of the factors representing the usage of a vehicle; calculating a second line pressure compensation value according to the driving tendency depending on the accumulated values of the factors representing the driving tendency; determining a final line pressure by adding the first line pressure compensation value according to the usage and the second line pressure compensation value according to the driving tendency to a basic line pressure; and operating a transmission hydraulic system according to the final line pressure.

In another embodiment, the factors representing the usage of a vehicle may include the total mileage of the vehicle.

In one embodiment, the first line pressure compensation value according to the usage may be calculated as a compensation value determined from a map of compensation values according to the total mileage of a vehicle.

The factors representing the driver's driving tendency may include at least one of a frequency of rapid acceleration (hereinafter, rapid acceleration frequency) of the vehicle, a frequency of rapid deceleration (hereinafter, rapid deceleration frequency) of the vehicle, or a total input revolution number of the vehicle transmission, and a total shift number of the vehicle transmission. In particular, the rapid acceleration is cumulatively counted when an amount of acceleration of the vehicle is equal to or greater than a reference acceleration value, and the rapid deceleration is cumulatively counted when an amount of the deceleration of the vehicle is equal to less than a deceleration reference value.

The rapid acceleration frequency of a vehicle may be calculated by dividing the accumulated number of times of rapid acceleration in which the vehicle's acceleration is equal to or higher than a predetermined reference acceleration divided by the total mileage; and the rapid deceleration frequency of a vehicle may be calculated by dividing the accumulated number of times of rapid deceleration in which the vehicle's deceleration is equal to or lower than a predetermined reference deceleration divided by the total mileage.

The second line pressure compensation value according to the tendency may be calculated by adding at least two of a compensation value determined from a map of compensation values according to the rapid acceleration frequency of a vehicle, a compensation value determined from a map of compensation values according to the rapid deceleration frequency of a vehicle, a compensation value determined from a map of compensation values according to the total input revolution number of a transmission, and a compensation value determined from a map of compensation values according to the total shift number.

In another form, the step of operating the transmission hydraulic system according to the final line pressure includes: adjusting the final line pressure to a target line pressure by controlling a hydraulic pump and a pressure regulator valve of the vehicle transmission.

In other form, the basic line pressure may be determined by a preset basic line pressure map according to the driving conditions of the vehicle.

The basic line pressure map may include a map of line pressure according to the input revolution number of the transmission and the input torque to the transmission, and oil temperature of the transmission.

According to the present disclosure, a decrease in line pressure of a transmission according to aging due to an increase in the mileage of a vehicle is prevented so that a malfunction of a transmission fail-safe system and unexpected clutch slippage, etc. of the transmission are prevented so as to ensure and maintain smooth and stable operability of the transmission.

BRIEF DESCRIPTION OF THE DRAWINGS

In order that the disclosure may be well understood, there will now be described various forms thereof, given by way of example, reference being made to the accompanying drawings, in which.

Figure 1:
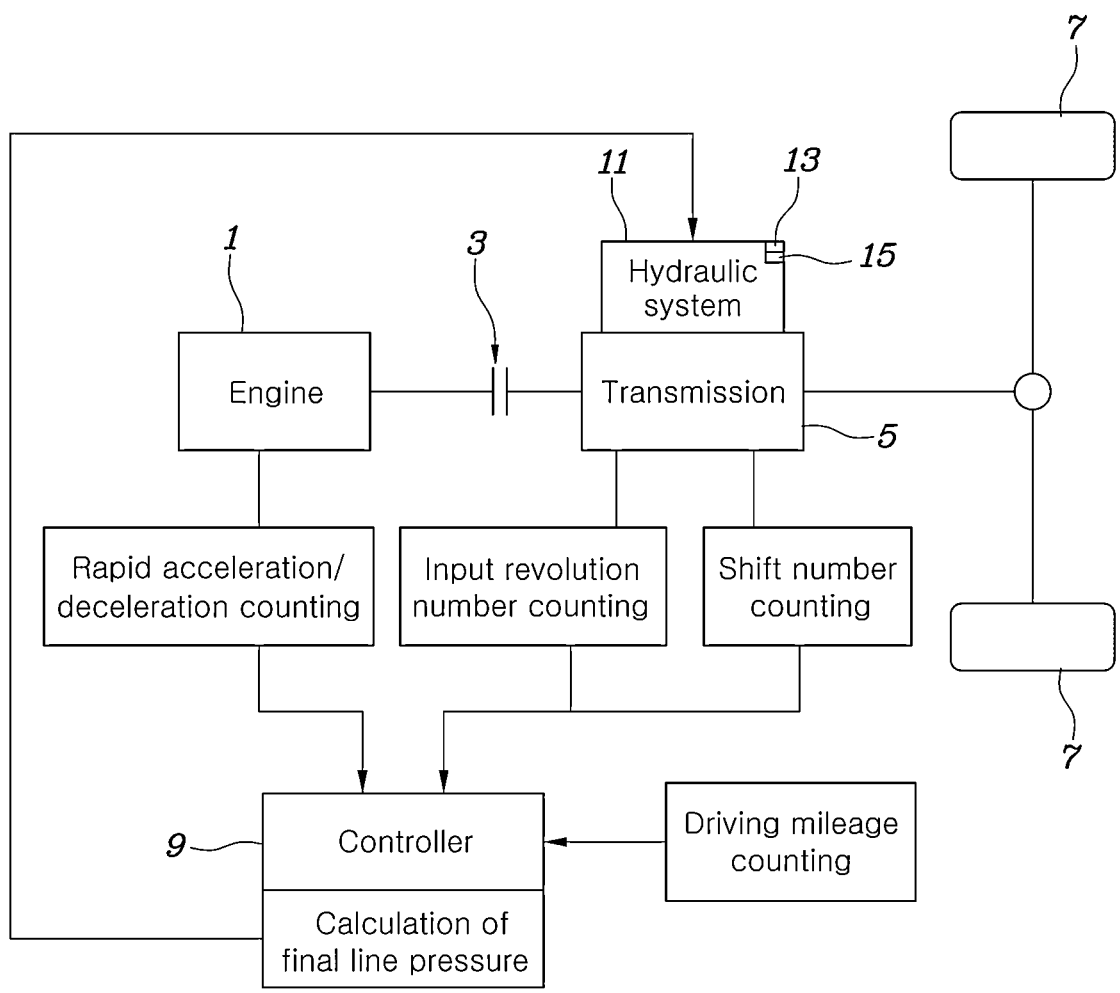
FIG. 1 is a view illustrating the configuration of a vehicle to which the present disclosure is applied.

The drawings described herein are for illustration purposes only and are not intended to limit the scope of the present disclosure in any way.

DETAILED DESCRIPTION

Specific structural or functional descriptions of the embodiments of the present disclosure disclosed herein are merely exemplified for the purpose of illustrating the embodiments according to the present disclosure, and the embodiments of the present disclosure are implemented in various forms, and may not be construed as being limited to the embodiments described in this specification or application.

Since the embodiment according to the present disclosure can be diversely modified into various forms, specific embodiments are illustrated and described in detail in the drawings and the description of the present disclosure. However, this is not intended to limit the embodiments according to the concept of the present disclosure to specific disclosure forms, but should be understood to include all modifications, equivalents, or substitutes included in the spirit and scope of the present disclosure.

It should be understood that although the terms "first", "second", etc. may be used herein to describe various elements, these elements should not be limited by these terms. These terms are only used to distinguish one element from another element. Thus, a first element discussed below could be termed a second element and vice versa without departing from the nature of the present disclosure.

It should be understood that when an element is referred to as being "connected" or "coupled" to another element, it can be directly connected or coupled to the other element or intervening elements may be present therebetween. In contrast, when an element is referred to as being "directly connected" or "directly coupled" to another element, there are no intervening elements present. Other expressions describing the relationship between the components, such as "between" and "immediately between" or "neighboring" and "directly neighboring" should also be interpreted in the same manner.

The terminology used herein is for the purpose of describing particular embodiments only and is not intended to limit the present disclosure. As used herein, the singular forms "a", "an", and "the" are intended to include the plural forms as well, unless the context clearly indicates otherwise. It should be further understood that the terms "comprises" and/or "comprising", or "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, the meaning of all terms including technical and scientific terms used herein is the same as that commonly understood by one of ordinary skill in the art to which the present disclosure pertains. It should be further understood that terms, such as those defined in commonly used dictionaries, should be interpreted as having a meaning which is consistent with their meaning in the context of the relevant art and the present disclosure, and should not be interpreted in an idealized or overly formal sense unless expressly so defined herein.

Hereinafter, some embodiments the present disclosure are described in detail with reference to the accompanying drawings. Like reference numerals in respective drawings figure indicate like elements.

FIG. 1 illustrates the configuration of a vehicle to which the present disclosure is applied, wherein the power of an engine 1 is input to a transmission 5 through a clutch 3 and output to driving wheels 7, and a controller 9 calculates a final line pressure on the basis of the information obtained from a vehicle including the engine 1 and the transmission 5 to control a transmission hydraulic system 11.

Figure 2:
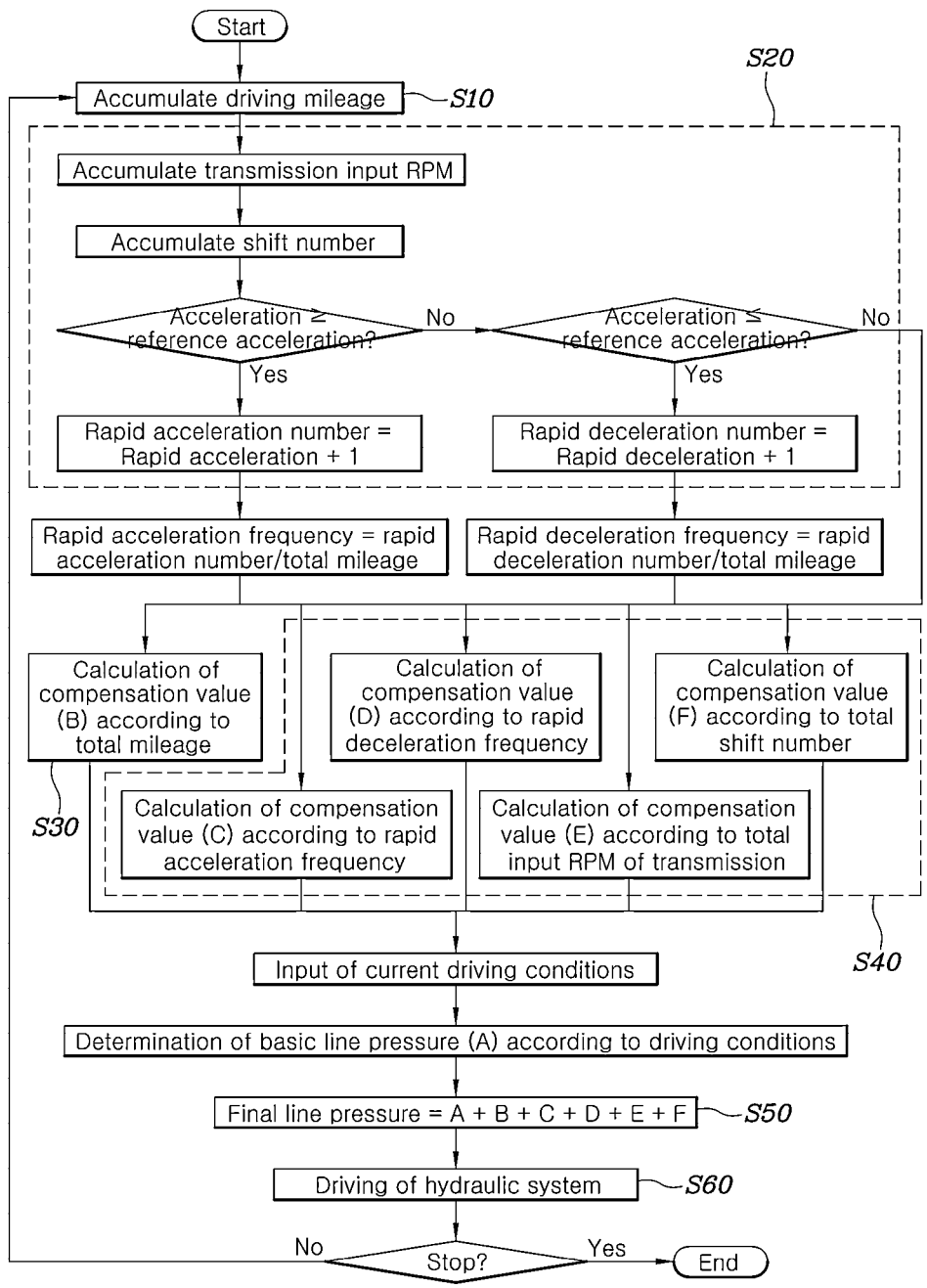
FIG. 2 is a flowchart illustrating an embodiment of a vehicle transmission hydraulic pressure control method according to the present disclosure.

Referring to FIG. 2, a vehicle transmission hydraulic pressure control method according to an embodiment of the present disclosure includes: accumulating factors representing usage of a vehicle (S10); accumulating factors representing driver's driving tendency (S20); calculating a line pressure compensation value according to the usage depending on the accumulated values of the factors representing the usage of the vehicle (S30); calculating a line pressure compensation value according to the driver's driving tendency depending on the accumulated values of the factors representing the driver's driving tendency (S40); determining a final line pressure by adding the line pressure compensation value according to the usage and the line pressure compensation value according to the driver's driving tendency to a basic line pressure (S50); and operating a transmission hydraulic system according to the final line pressure (S60).

In one form, the present disclosure operate the hydraulic system with the final line pressure determined by adding the line pressure compensation value according to the usage considering a factor for the vehicle usage and the line pressure compensation value according to the driver's driving tendency considering a factor for the driver's driving tendency to the basic line pressure, thereby allowing for appropriate compensation for the reduction in transmission line pressure caused by the aging of a vehicle according to elapsed service period of a vehicle.

Accordingly, the present disclosure prevents a malfunction of the transmission fail-safe system due to poor line pressure so that unexpected slippage of the clutch is prevented, thereby ensuring and maintaining smooth and stable operability of the transmission.

The factor representing the vehicle usage includes a total mileage of a vehicle.

That is, the total mileage of a vehicle is the most suitable factor to represent the vehicle usage, and the mileage of a vehicle is continuously accumulated to calculate a compensation value for correcting the line pressure according to the accumulated total mileage.

Figure 3:
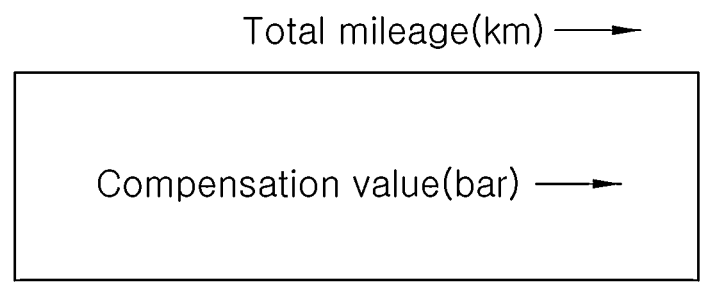
FIG. 3 is a diagram illustrating a map of compensation values according to the total mileage.
Figure 4:
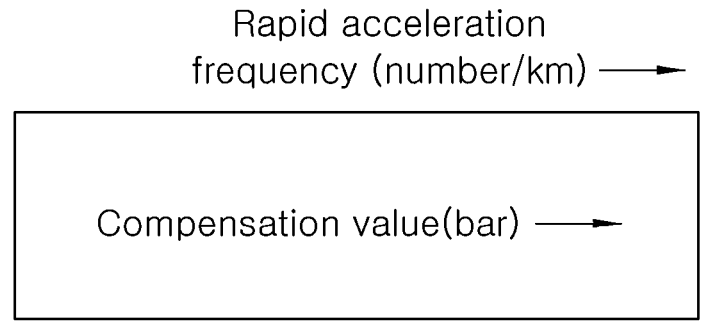
FIG. 4 is a diagram illustrating a map of compensation values according to rapid acceleration frequency.
Figure 5:
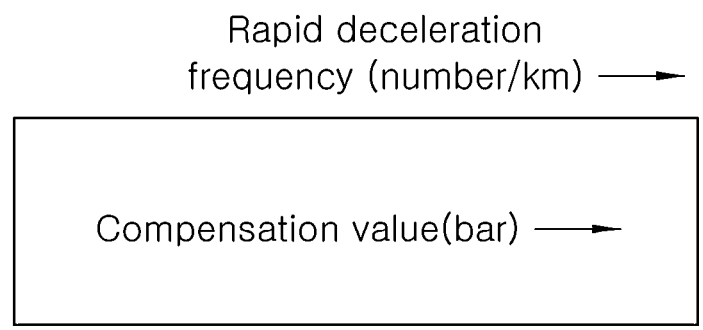
FIG. 5 is a diagram illustrating a map of compensation values according to rapid deceleration frequency.
Figure 6:
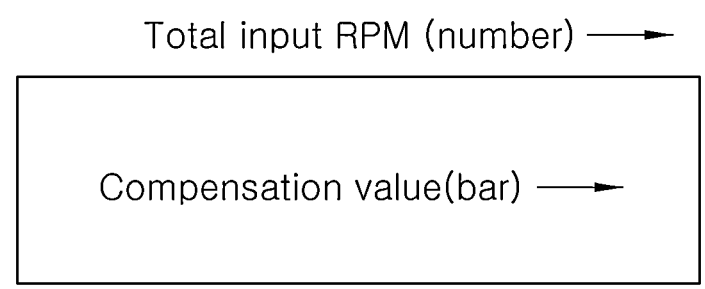
FIG. 6 is a diagram illustrating a map of compensation values according to total input revolutions of a transmission.
Figure 7:
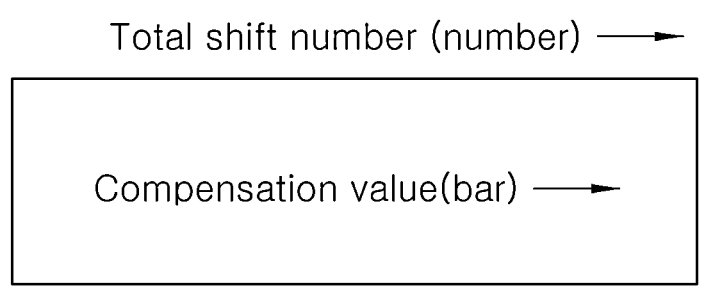
FIG. 7 is a diagram illustrating a map of compensation values according to the total number of shifts.

For example, the line pressure compensation value according to the usage may be calculated as a compensation value determined from a map of compensation values according to the total mileage of a vehicle as illustrated in FIG. 3.

Meanwhile, the factor representing the driver's driving tendency may include at least one of a rapid acceleration frequency of the vehicle, a rapid deceleration frequency of the vehicle, a total input revolution number of the transmission, and a total shift number of the transmission.

The total input revolution number of the transmission has a higher value as a driver uses a high revolution speed region of an engine, and thus may represent not only the driver's driving tendency, but also the usage of a vehicle.

In addition, since the total shift number also has a higher value as more frequent shift situations are caused by the driver's vehicle manipulation, the total shift number may represent not only the driver's driving tendency, but also the usage of a vehicle.

In this way, the total input revolution number and the total shift number of the transmission may represent not only the driver's driving tendency, but also the usage of a vehicle similar to the total mileage. Thus, although the total input revolution number and the total shift number of the transmission may be included as a factor representing the usage of a vehicle, they are expressed herein as representing the driver's driving tendency.

In addition, the transmission input revolution number and the shift number are expressed as frequencies obtained by division with the total mileage, like the rapid acceleration and deceleration frequencies to be described later, so that they may be reflected in the present disclosure in a state in which the characteristics representing the driver's driving tendency are further strengthened.

The line pressure compensation value according to the tendency may be calculated by adding at least two of a compensation value determined from a map of compensation values according to the rapid acceleration frequency of a vehicle, a compensation value determined from a map of compensation values according to the rapid deceleration frequency of a vehicle, a compensation value determined from a map of compensation values according to the total input revolution number of a transmission, and a compensation value determined from a map of compensation values according to the total shift number.

For reference, in the present embodiment, as illustrated in FIG. 2, the line pressure compensation value according to the tendency is calculated by adding all of the compensation values.

In addition, in the maps of FIGS. 3 to 7, the arrow indicates that the item has a tendency to gradually increase along the direction of the arrow.

Here, the rapid acceleration frequency of a vehicle may be calculated by dividing an accumulated number of time of the rapid acceleration, which is counted and accumulated when the vehicle acceleration is equal to or higher than a predetermined reference acceleration divided by the total mileage; and the rapid deceleration frequency of a vehicle may be calculated by dividing an accumulated number of time of the rapid deceleration, which is counted and accumulated when the vehicle deceleration is equal to or lower than a predetermined reference deceleration divided by the total mileage.

In the step of driving the transmission hydraulic device according to the final line pressure, the final line pressure may be adjusted to the target line pressure by adjusting a hydraulic pump 13 and a pressure regulator valve 15.

That is, when the hydraulic pump 13 is configured as an electric type, the controller 9 drives the hydraulic pump 13 to increase the line pressure to the final line pressure, which is regulated by the pressure regulator valve 15.

On the other hand, the basic line pressure is determined by a preset basic line pressure map according to the driving conditions of a vehicle, where the basic line pressure map may be a map of the line pressure according to the input torque and the input revolution number input to the transmission, and the oil temperature, which can use conventionally known techniques.

Accordingly, the controller 9 sets the line pressure calculated from the map according to the input torque, the input revolution number, and the oil temperature, as the basic line pressure, and adds the line pressure compensation values according to the usage and the tendency thereto to calculate the final line pressure.

Although the present disclosure has been described and illustrated with respect to the specific embodiments, it would be obvious to those having ordinary skill in the art that various improvements and modifications are possible, without departing from the scope and spirit of the present disclosure.

What is claimed is:

1. A hydraulic pressure control method for a vehicle transmission, the hydraulic pressure control method comprising:
   accumulating factors representing usage of a vehicle;
   accumulating factors representing a driving tendency of a driver of the vehicle;
   calculating a first line pressure compensation value according to the usage based on accumulated values of the factors representing the usage of the vehicle;
   calculating a second line pressure compensation value according to the driving tendency based on accumulated values of the factors representing the driving tendency;
   determining a final line pressure by adding the first line pressure compensation value according to the usage and the second line pressure compensation value according to the driving tendency to a basic line pressure; and
   operating a transmission hydraulic system according to the final line pressure.

2. The hydraulic pressure control method according to claim 1, wherein the factors representing the usage of the vehicle includes a total mileage of the vehicle.

3. The hydraulic pressure control method according to claim 2, wherein the first line pressure compensation value according to the usage is calculated as a compensation value determined from a map of compensation values according to the total mileage of the vehicle.

4. The hydraulic pressure control method according to claim 2, wherein the factors representing the driving tendency includes at least one of a frequency of rapid acceleration of the vehicle, a frequency of rapid deceleration of the vehicle, a total input revolution number of the vehicle transmission, or a total shift number of the vehicle transmission,
   wherein the rapid acceleration is cumulatively counted when an amount of acceleration of the vehicle is equal to or greater than a reference acceleration value, and the rapid deceleration is cumulatively counted when an amount of the deceleration of the vehicle is equal to less than a deceleration reference value.

5. The hydraulic pressure control method according to claim 4, wherein the rapid acceleration frequency of a vehicle is calculated by dividing an accumulated number of times of rapid acceleration in which the vehicle acceleration is equal to or higher than a predetermined reference acceleration divided by the total mileage; and the rapid deceleration frequency of a vehicle is calculated by dividing an accumulated number of times of the rapid deceleration in which the vehicle deceleration is equal to or lower than a predetermined reference deceleration divided by the total mileage.

6. The hydraulic pressure control method according to claim 4, wherein the second line pressure compensation value according to the driving tendency is calculated by adding at least two of a compensation value determined from a map of compensation values according to the frequency of the rapid acceleration, a compensation value determined from a map of compensation values according to the frequency of the rapid deceleration, a compensation value determined from a map of compensation values according to the total input revolution number of the vehicle transmission, and a compensation value determined from a map of compensation values according to the total shift number of the vehicle transmission.

7. The hydraulic pressure control method according to claim 1, wherein operating the transmission hydraulic system according to the final line pressure includes: adjusting the final line pressure to a target line pressure by controlling a hydraulic pump and a pressure regulator valve of the vehicle transmission.

8. The hydraulic pressure control method according to claim 1, wherein the basic line pressure is determined by a preset basic line pressure map according to driving conditions of the vehicle.

9. The hydraulic pressure control method according to claim 8, wherein the preset basic line pressure map includes a map of line pressure according to a torque input to the vehicle transmission, an input revolution number to the vehicle transmission, and an oil temperature of the vehicle transmission.

* * * * *